2,878,264
Patented Mar. 17, 1959

2,878,264

SUBSTITUTED AMINO ALCOHOLS

Carl D. Lunsford, Richmond, Va., assignor to A. H. Robins Company, Inc., Richmond, Va., a corporation of Virginia No Drawing. Application September 26, 1957
Serial No. 686,299

11 Claims. (Cl. 260—326.5)

This invention relates to 3-aryl derivatives of 3-pyrrolidinol and is more particularly concerned with 3-aryl derivatives of N-hydrocarbon substituted-3-pyrrolidinols and their acid addition salts.

The compounds of the present invention are substituted pyrrolidinols and are related in action to such adrenergic blocking agents as N,N-dibenzyl-β-chloroethylamine (Dibenamine) and phenoxybenzamine (Dibenzyline).

The prior art with which the present compounds may be compared is divergent and distinct from this invention. United States Patent 2,446,804 (Bergel et al.) teaches the preparation of 1-alkyl-3-aryl-3-carbalkoxy pyrrolidines and the utility is disclosed generally as a therapeutic. British Patent 667,923 (Badische) teaches 1-aryl-1,2,3,4 tetra alkyl-4-hydroxy pyrrolidines for undisclosed pharmacutical preparations.

In contrast to the known prior art the present invention is directed to modification of the N-hydrocarbon-3-pyrrolidinols by substitution of an aryl radical on the carbon atom at the 3 position.

Therefore, it is an object of this invention to provide novel 3-aryl-3-pyrrolidinols. These compounds are characterized by single aryl and hydroxy substituents on the carbon atoms of the heterocyclic ring.

It is a further object of this invention to provide novel 3-aryl-3-pyrrolidinols wherein the 1 or N position is substituted by a hydrocarbon radical.

It is a special object of this invention to provide novel compounds which have an effect on the circulatory system and which function as adrenergic blocking agents.

Members of this group of compounds by preliminary pharmacological tests have been shown to have utility as adrenergic blocking agents and as agents affecting the circulatory system.

This invention comprises a novel group of 3-aryl derivatives of 3-pyrrolidinols, especially N hydrocarbon radical substituted-3-pyrrolidinols. The aryl substituent at the 3 position as defined in this specification and claims may be a simple aryl, such as phenyl, or a substituted aryl, such as an alkoxy- or hydroxy- or halogen-substituted aryl. Preferably the nitrogen atom in the pyrrolidine ring is substituted with a hydrocarbon radical, such as alkyl, aryl, aralkyl and the like. For solubility and other reasons, the acid addition salts such as the hydrohalides are a preferred form of the invention.

Among the 3-aryl-3-pyrrolidinols operable within the scope of the present invention are the 1-hydrocarbon radical substituted 3-p-anisyl-3-pyrrolidinols, the 1-hydrocarbon radical substituted 3-p-halophenyl-3-pyrrolidinols and the hydrocarbon radical substituted 3-p-hydroxyphenyl-3-pyrrolidinols. Representative compounds are 1-ethyl-3-phenyl-3-pyrrolidinol; 1-n-butyl-3-phenyl-3-pyrrolidinol hydrochloride; 1-benzyl-3-p-methoxyphenyl-3-pyrrolidinol hydrochloride; 1-ethyl-3-p-hydroxyphenyl-3-pyrrolidinol and 3-phenyl-3-pyrrolidinol hydrochloride.

The compounds of the present invention may be expressed generally by the following formula:

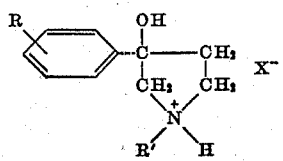

where

R' is hydrogen or a hydrocarbon radical such as alkyl, preferably lower alkyl, or aralkyl, and the like.

R may be hydrogen, a hydroxy radical, a halogen, or an alkoxy radical, preferably a lower alkoxy radical, and the like.

X may be halogen or other anion of a pharmaceutically acceptable acid addition salt.

Preferred compounds within the scope of the present invention are the 3-phenyl-3-pyrrolidinols where the N or 1 position is unsubstituted or substituted by a lower alkyl radical. Such compounds are exemplified by 3-phenyl-3-pyrrolidinol and 1-isobutyl-3-phenyl-3-pyrrolidinol.

Generally, the 3-aryl-3-pyrrolidinols are conveniently prepared by reaction of an N-substituted-3-pyrrolidinone in ethereal solution with a Grignard reagent whose corresponding aryl fraction is selected to introduce the 3-aryl substituent. Upon subsequent hydrolysis with an aqueous alkaline solution such as 50 percent sodium hydroxide, extracting with ether and recovering the ether extract, the free base is prepared usually in the form of an oil. The hydrohalide salts may be prepared from the base by an addition reaction in ethereal solution. The hydrohalide salts such as the hydrochloride addition salts are generally white powders. Both the free bases and the acid addition salts were prepared. The salts were generally preferred for solubility and other reasons.

Compounds of this invention, when the N or 1 position are unsubstituted or contain hydrogen may be conveniently prepared by catalytic hydrogenation of the corresponding 1-benzyl compound. For example, in the presence of a 10 percent palladium catalyst on carbon, 1-benzyl-3-phenyl-3-pyrrolidinol is converted to 3-phenyl-3-pyrrolidinol.

Compounds, where the 3-aryl substituent is 3-p-hydroxyphenyl may also be prepared in a similar fashion by reduction of the corresponding 3-p-benzyloxy compound. For example, in the presence of a suitable hydrogenation catalyst such as platinum or palladium on carbon, 1-ethyl-3-p-benzyloxyphenyl-3-pyrrolidinol is converted to 1-ethyl-3-p-hydroxyphenyl-3-pyrrolidinol.

The 3-pyrrolidinone starting materials are known in the art and may be prepared by a variation of the Dieckmann acetoacetic ester cyclization reaction adapted for nitrogen heterocycles according to the method of Prill and McElvain (J. A. C. S. 55, 1233 (1933) and also Leonard et al., J. A. C. S. 73, 2371 (1951) who describe the preparation of the N-methyl and N-butyl members).

An example of the preparation of the pyrrolidinone starting material typical of the group is set out below.

PREPARATION I.—1-ISOPROPYL-3-PYRROLIDINONE

*Ethyl - β - isopropylaminopropionate.*—Ethyl acrylate (1500 grams, 15 moles) which was stabilized by the addition of 15 grams of hydroquinone was added at a rapid dropwise rate to 1182 grams (20 moles) of isopropyl amine with stirring and control of the temperature at 25° C. After complete addition the mixture was heated for four hours at 60° C. and fractionated. The product 2220 grams (93 percent) was collected at 90°–92° C./18 mm.

*Ethyl - β - (N - carbethoxymethyl - N-isopropylamino)-propionate.*—A mixture of 1110 grams (7.0 moles) of ethyl-β-isopropylaminopropionate and 970 grams (7.0 moles) of anhydrous potassium carbonate was stirred and heated to 100° C. under anhydrous conditions. While maintaining this temperature, 860 grams (7.0 moles) of ethyl chloroacetate was added dropwise with continuous stirring. After complete addition, heating at 100° C. was continued for four hours. The mixture was then cooled; one liter of cold water was added; and the oil layer was separated. The aqueous layer was extracted with ether which was combined with the oil, dried over sodium sulfate, and fractionated. The product, 1112 grams (65 percent) boiled at 124°–130° C./2.0 mm.

*1-isopropyl-3-pyrrolidinone.*—Anhydrous benzene (500 ml.) was added to a solution of 72.5 grams (3.15 moles) of sodium in 1500 ml. of dry methanol under anhydrous conditions. To this refluxing solution was added 772 grams (3.15 moles) of ethyl-β-(N-carbethoxymethyl-N-isopropylamino)-propionate in a steady stream and the mixture was stirred and partially distilled for one hour. A solution of 523 ml. (6.3 moles) of hydrochloric acid in one liter of water was added and the mixture was stirred and refluxed for three hours and then cooled to 20° C. Anhydrous potassium carbonate (434 grams, 3.15 moles) was added and the mixture was stirred for 20 minutes, filtered and extracted with about one liter of chloroform in several portions. The chloroform layer was dried over sodium sulfate and concentrated. Fractionation of the residue gave 213 grams (53 percent) of 1-isopropyl-3-pyrrolidinone boiling at 76°–80° C./20 mm.

The following examples illustrate the preparation of the 3-aryl-3-pyrrolidinols and their hydrohalide addition salts.

Example 1.—1-benzyl-3-phenyl-3-pyrrolidinol

In an apparatus protected from the atmosphere by a calcium chloride drying tube a Grignard reagent, phenyl magnesium bromide, was prepared in the usual manner from 157 grams (1.0 mole) of bromobenzene and 24.3 grams (1.0 mole) magnesium turnings in about one liter of dry ether. To this solution there was added 89 grams (0.5 mole) of 1-benzyl-3-pyrrolidinone with stirring at a rate which maintained gentle reflux of the solution. After complete addition, stirring and refluxing was continued for one hour and hydrolysis was accomplished with water and 50 percent sodium hydroxide. The ether layer was decanted and the gummy residue was repeatedly extracted with ether. The ether extracts were combined, washed with water, dried over sodium sulfate, and concentrated. Fractionation of the residue yielded 78 grams (61 percent) of 1-benzyl-3-phenyl-3-pyrrolidinol as an oil, B. P. 169°–174° C./0.2 mm.

The hydrochloride was prepared by precipitation of the salt from an ethereal solution of the base by ethereal hydrogen chloride. After multiple crystallizations from butanone the melting point was 154°–156° C. The resulting compound, 1-benzyl-3-phenyl-3-pyrrolidinol hydrochloride was a white powder, soluble in water.

The 1-methyl-, 1-ethyl-, 1-n-propyl-, and 1-isobutyl-3-phenyl-3-pyrrolidinols as free bases were prepared in an analogous manner and converted to hydrochloride addition salts. A summary of the properties of the ultimate compounds is set out in Table I.

Example 2.—1-n-butyl-3-phenyl-3-pyrrolidinol

In an apparatus protected from the atmosphere by a calcium chloride drying tube, a Grignard reagent, phenyl magnesium bromide, was prepared in the usual manner from 145 grams (0.93 mole) of bromobenzene and 22.6 grams (0.93 mole) of magnesium turnings in about one liter of dry ether. To this solution there was added 65.5 grams (0.455 mole) of 1-n-butyl-3-pyrrolidinone, with stirring at a rate which maintained gentle reflux of the solution. After complete addition, stirring and refluxing was continued for one hour and hydrolysis was accomplished with water and 50 percent sodium hydroxide. The ether layer was decanted and the gummy residue was repeatedly extracted with ether. The ether extracts were combined, washed with water, and dried over sodium sulfate and concentrated. Fractionation of the residue yielded 41.5 grams (41.7 percent) of 1-n-butyl-3-phenyl-3-pyrrolidinol, boiling point 134°–145° C./0.3 mm. In appearance the compound was a yellow oil.

The base was converted to the hydrochloride by solution in dry ether and the addition of ethereal hydrogen chloride. The oil which precipitated was crystallized from butanone and had a final melting point of 118.5°–120° C. The resulting compound, 1-n-butyl-3-phenyl-3-pyrrolidinol hydrochloride was a white powder, soluble in water.

Example 3.—3-phenyl-3-pyrrolidinol

A solution of 78 grams (0.31 mole) of 1-benzyl-3-phenyl-3-pyrrolidinol in 200 ml. of absolute alcohol was shaken with 5 grams of 10 percent palladium on charcoal catalyst at 60° C. in an atmosphere of hydrogen until the theoretical amount of gas had been absorbed. About five hours were required. The solution was clarified by filtration and concentrated, and the residue was fractionated. Yield 33.5 grams (66 percent) of 3-phenyl-3-pyrrolidinol; B. P. 120°–125° C./0.3 mm. After crystallization from toluene the melting point was 89°–90° C.

*Analysis.*—Calculated for $C_{10}H_{13}NO$: C, 73.59; H, 8.03. Found: C, 73.75; H, 8.03.

The hydrochloride was formed by precipitation from an ethereal solution of the base with ethereal hydrogen chloride. Recrystallization from isopropyl alcohol, a butanone-methanol mixture, or an absolute alcohol-ether mixture gave a constant melting point of 145–146.5° C. The 3-phenyl-3-pyrrolidinol hydrochloride produced was a white powder, soluble in water.

Example 4.—1-methyl-3-p-methoxyphenyl-3-pyrrolidinol

In an apparatus protected from the atmosphere by a calcium chloride drying tube a Grignard reagent, p-methoxyphenyl magnesium bromide, was prepared in the usual manner from 100 grams (0.535 mole) of p-bromoanisole and 13 grams (0.535 mole) of magnesium turnings in about 500 ml. of dry ether. To this solution there were added 25.8 grams (0.26 mole) of 1-methyl-3-pyrrolidinone with stirring at a rate which maintained gentle reflux of the solution. After complete addition, stirring and refluxing was continued for one hour, and hydrolysis was accomplished with water and 50 percent sodium hydroxide. The ether layer was decanted and the gummy residue repeatedly extracted with ether. The ether extracts were combined, washed with water, dried over sodium sulfate, and concentrated. Fractionation of the residue yielded 18 grams (34 percent) of 1-methyl-3-p-methoxyphenyl-3-pyrrolidinol, boiling at 108–111° C./0.04 mm. The material was crystallized several times from isooctane and melted at 79° C. In appearance this compound was a tan powder, insoluble in water.

The 1-isobutyl- and 1-benzyl-3-p-methoxyphenyl-3-pyrrolidinols were prepared in an analogous manner and converted to hydrochloride salts. A summary of the properties of the ultimate compounds as salts is set out in Table I.

*Example 5.—1-ethyl-3-(3,4-dihydroxyphenyl)-3-pyrrolidinol*

In an apparatus consisting of a two liter three-neck round-bottom flask fitted with a mechanical stirrer, a dropping funnel and a calcium chloride protector condenser, the Grignard reagent, 2,2-dimethylbenzodioxolane-5-magnesium bromide, was prepared in the usual manner from 96 grams (0.42 mole) of 5-bromo-2,2-dimethylbenzodioxolane and 11 grams (0.44 mole) of magnesium in about 500 ml. of dry ether. To this solution was added 28.2 grams (0.25 mole) of freshly distilled 1-ethyl-3-pyrrolidinone with stirring at a rate which maintained gentle reflux. After complete addition, the mixture was stirred for fifteen minutes and hydrolyzed with water and 50% aqueous sodium hydroxide. The ether layer was separated and the aqueous layer was extracted with several additional portions of ether. The combined ether extracts were washed with water, dried over sodium sulfate and concentrated. The residue was fractionated at reduced pressure. The fraction boiling at 130–150° C./0.5 mm. was obtained. This was triturated with 30 cc. of 10% aqueous hydrogen chloride and filtered. The filtrate was heated on the steam bath for fifteen minutes, cooled, extracted with ether, and basified with solid sodium bicarbonate which caused precipitation of the solid product.

After recrystallization from butanone the compound melted at 152–154° C.

*Analysis.*—Calculated for $C_{12}H_{17}NO_3$: C, 64.55; H, 7.68. Found: C, 64.45; H, 7.81.

The hydrochloride salt was prepared by treating a butanone solution of the base with ethereal hydrogen chloride. It was crystallized from a butanone-methanol mixture; M. P. 202–203° C.

*Analysis.*—Calculated for $C_{12}H_{17}NO_3 \cdot HCl$: C, 55.49; H, 6.99; Cl⁻, 13.65; N, 5.39. Found: C, 55.47; H, 7.07; Cl⁻, 14.19; N, 5.35.

*Example 6.—1-n-butyl-3-p-chlorophenyl-3-pyrrolidinol hydrochloride*

In an apparatus consisting of a two liter three-neck round-bottom flask fitted with a mechanical stirrer, a dropping funnel and a calcium chloride protected condenser, the Grignard reagent, p-chlorophenylmagnesium bromide, was prepared in the usual manner from 76.6 grams (0.4 mole) of 1-bromo-4-chlorobenzene and 9.6 grams (0.4 mole) of magnesium turnings in about 300 ml. of dry ether. To this solution was added 28.2 grams (0.3 mole) of 1-n-butyl-3-pyrrolidinone with stirring at a rate which maintained gentle reflux of the solution. After complete addition stirring and refluxing were continued for 15 minutes, and the mixture was hydrolyzed with water and 50% aqueous sodium hydroxide. The ether layer was decanted and the gummy residue was repeatedly extracted with ether. The combined ether extracts were extracted with 3 N hydrochloric acid, and the acid extract was basified with solid potassium carbonate and reextracted with ether. This ether extract was washed with water, dried over sodium sulfate and concentrated. The residue was fractionated in vacuo and gave 15 grams (15%) of oil; B. P. 157° C./0.14 mm. This oil was converted to the hydrochloride salt by treating an ethereal solution with ethereal hydrogen chloride. The salt, which precipitated as an oil was crystallized from butanone; M. P. 147–149° C.

*Analysis.*—Calculated for $C_{14}H_{20}ClNO \cdot HCl$: 12.22% Cl⁻; C, 57.93; H, 7.29. Found: 12.22% Cl⁻; C, 57.84; H, 7.27.

Members of this group of compounds have been tested

TABLE I.—3-ARYL-3-PYRROLIDINOLS

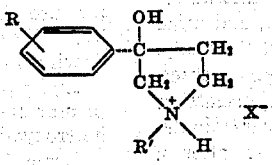

| R' | R | X⁻ | Solubility | Mol. Weight | Melting Point, °C. | Calculated For— | Analysis, percent | | | Found, percent | | | Yield[2] (percent) | Mouse I.V. LD₅₀, mg./kg. |
|---|---|---|---|---|---|---|---|---|---|---|---|---|---|---|
| | | | | | | | C | H | Cl | C | H | Cl | | |
| H | H | Cl | 1 | 199.70 | 145–146.5 | $C_{10}H_{13}NO \cdot HCl$ | 60.15 | 7.07 | 17.76 | 60.27 | 6.90 | 17.68 | [1] 66 | 250 |
| CH₃ | H | Cl | 1 | 213.71 | 142–143 | $C_{11}H_{15}NO \cdot HCl$ | | | 16.64 | | | 16.53 | 23 | 200–240 |
| C₂H₅ | H | Cl | 1,2 | 227.73 | 121–124 | $C_{12}H_{17}NO \cdot HCl$ | | | 15.62 | | | 15.53 | 54 | 132 |
| n-C₃H₇ | H | Cl | 1 | 241.76 | 121–122 | $C_{13}H_{19}NO \cdot HCl$ | 64.58 | 8.34 | 14.67 | 64.84 | 8.17 | 14.80 | 42 | |
| n-C₄H₉ | H | Cl | 1 | 255.79 | 118.5–120 | $C_{14}H_{21}NO \cdot HCl$ | | | 13.86 | | | 13.90 | 42 | 44.2 |
| i-C₄H₉ | H | Cl | 1 | 255.79 | 154–156 | $C_{14}H_{21}NO \cdot HCl$ | 65.73 | 8.67 | 13.86 | 65.97 | 8.49 | 13.83 | 54 | 62 |
| C₆H₅CH₂ | H | Cl | 1 | 289.80 | 154–156 | $C_{17}H_{19}NO \cdot HCl$ | | | 12.24 | | | 12.26 | 61 | 30.5 |
| CH₃ | p-OCH₃ | (base) | *1 | 207.27 | 79 | $C_{12}H_{17}NO_2$ | 69.53 | 8.27 | [3] (6.76) | 69.52 | 8.17 | [3] (6.67) | 34 | 142 |
| i-C₄H₉ | p-OCH₃ | Cl | 1 | 285.81 | 145–147 | $C_{15}H_{23}NO_2 \cdot HCl$ | | | 12.41 | | | 12.43 | 39 | |
| C₆H₅CH₂ | p-OCH₃ | Cl | 1 | 319.83 | 155–157 | $C_{18}H_{21}NO_2 \cdot HCl$ | 67.59 | 6.62 | 11.09 | 67.79 | 6.90 | 11.22 | 58 | 27 |
| C₂H₅ | p-OH | Cl | 1 | 243.72 | 209.5–210 | $C_{12}H_{17}NO_2 \cdot HCl$ | | | 14.54 [3] (5.74) | | | 14.85 [3] (5.66) | | |
| n-C₄H₉ | p-Cl | Cl | 1 | 290.24 | 147–149 | $C_{14}H_{20}ClNO \cdot HCl$ | | | 12.22 | | | 12.22 | | 30 |
| C₂H₅ | m,p-OH | Cl | 1 | 259.74 | 202–203 | $C_{12}H_{17}NO_3 \cdot HCl$ | 55.49 | 6.99 | 13.65 | 55.47 | 7.07 | 14.19 | | 1.0 |
| n-C₄H₉ | p-Br | Cl | 1 | 334.70 | 156–157 | $C_{14}H_{20}BrNO \cdot HCl$ | | | 10.62 | | | 10.63 | | |
| C₂H₅ | p-Cl | HCCOO‖HCOOH | 1,2 | 341.79 | 114–115 | $C_{16}H_{20}ClNO_5$ | Nitrogen (N) | | 4.10 | 4.13 | | | | |

Solubility=soluble in (1) water; (2) alcohol.
*Insoluble in water as the base.
[1] Yield of base from the N-benzyl compound.
[2] Yield of base from the 3-pyrrolidinone.
[3] Nitrogen analysis.

in mice for acute toxicity wherein evaluation of the LD₅₀'s was made by the method of Litchfield and Wilcoxon, J. Pharm. and Exptl. Therap. 96, 99 (1949). The LD₅₀ results are set out in Table I above.

Additionally, members of this group of compounds were tested in vivo in dogs for activity as inhibiting or blocking agents to the effect on blood pressure of acetyl choline, histamine phosphate and adrenalin chloride, according to the following method.

Mongrel dogs of either sex were anesthetized by the intravenous injection of phenobarbital sodium (100 mg./kg.). Surgery was supported with intravenous pentobarbital sodium. A carotid artery was cannulated and connected to a mercury manometer for recording blood pressure; a Pfeiffer cannula was inserted into the trachea and connected to a Marey tambour for recording respiration; a femoral vein was exposed for introduction of all materials; and the urinary bladder was catheterized for measuring urinary output. Blood pressure and respiration were recorded by ink-writing levers on a Gorrell and Gorrell kymograph operated at Speed P. Electrocardiograms were recorded on a Grass electroencephalograph (Model III D). Blood pressure responses to acetyl choline chloride, adrenalin chloride and histamine phosphate were recorded initially and at various times throughout the study. One animal was used for each compound.

A typical experiment evaluating 1-ethyl-3-phenyl-3-pyrrolidinol hydrochloride is set out below.

*Pharmacology Experiment A.*—The compound (1-ethyl-3-phenyl-3-pyrrolidinol hydrochloride) was dissolved in physiologic saline at a concentration of 100 mg./ml. One female dog (No. 917) weighing 6.3 kg. received intravenous injections of the material in doses of 1.0, 10, 10, 20, 40 and 80 mg./kg. during a period of four and one-half hours. Another female dog (No. 971) weighing 7.1 kg. received doses of 20, 40 and 100 mg./kg. during a period of three and one-half hours.

*Dog. No. 917.*—Intravenous injections of 1-ethyl-3-phenyl-3-pyrrolidinol hydrochloride in doses of 1.0 through 40 mg./kg. produced a transitory fall in blood pressure of 23 percent to 26 percent. The depressor response did not appear to be proportional to the dose. Slight respiratory stimulation was apparent following the 40 mg./kg. dose. There were no significant alterations of the responses to acetyl choline or histamine, and urine flow appeared within normal limits throughout the study.

Thirty minutes after the first of the two 10 mg./kg. doses, the heart rate was 184 beats/minute. This represents an increase over the control heart rate of 150 beats/minute. The heart rate dropped to 160 beats/minute after a second dose of 10 mg./kg. The T-wave was slightly augmented and the QRS complex was slightly depressed after both 10 mg./kg. doses. These effects are sometimes observed in apparently normal animals.

The most significant action of 1-ethyl-3-phenyl-3-pyrrolidinol hydrochloride was found to be its effect on the blood pressure response to adrenalin. Following the 1.0 mg./kg. dose of 1-ethyl-3-phenyl-3-pyrrolidinol hydrochloride the pressor response to adrenalin was markedly antagonized. Higher doses of 10 mg./kg. almost completely blocked the pressor activity. Responses to adrenalin followed the 20 and 40 mg./kg. doses of 1-ethyl-3-phenyl-3-pyrrolidinol hydrochloride demonstrated a reversal in activity of the adrenalin. A dose of adrenalin which was ten times the standard dose of 1-gamma/kg. was needed to reconvert adrenalin to its pressor activity. The fact that blockade of the pressor response to adrenalin could be overcome by increasing the dose of adrenalin suggests a competitive inhibition between 1-ethyl-3-phenyl-3-pyrrolidinol hydrochloride and adrenalin for the receptor mechanism. Increasing the dose of 1-ethyl-3-phenyl-3-pyrrolidinol hydrochloride to 40 mg./kg. reversed the pressor response to even the high dose of adrenalin (10 gamma/kg.).

*Dog. No. 971.*—This animal was used to determine whether the blood pressure reversal to adrenalin following injection of 1-ethyl-3-phenyl-3-pyrrolidinol hydrochloride, as observed in Dog. No. 917, could be reproduced.

The results were essentially the same for both dogs. The blood pressure responses to acetyl choline and histamine were unchanged by administration of 1-ethyl-3-phenyl-3-pyrrolidinol hydrochloride, and urine flow was within normal limits throughout the study. Electrocardiograms were not taken on this animal.

A dose of 20 mg./kg. of 1-ethyl-3-phenyl-3-pyrrolidinol hydrochloride completely reversed the blood pressure response to adrenalin. Within one hour after injection of the 20 mg./kg. dose the response to adrenalin was biphasic, the pressor phase being equally as great as the depressor phase. By two hours it had returned to its primary pressor activity; however, it remained markedly antagonized over that of the control adrenalin response. The administration of 40 mg./kg. of 1-ethyl-3-phenyl-3-pyrrolidinol hydrochloride caused a more pronounced reversal of adrenalin activity than did the lower dose of 20 mg./kg.

The compounds of the invention, while negative as to inhibition of the action of acetyl choline and histamine showed substantial activity in antagonism of adrenalin.

The activity of the compounds with respect to their uses as adrenergic blocking agents showed that as little as 1.0 mg./kg. inhibited the pressor action of adrenalin tested against the standard dosage of 1 gamma/kg. of adrenalin. A marked depression or blocking of the action of adrenalin occurred with several of the compounds such as 3-phenyl-3-pyrrolidinol hydrochloride and 1-ethyl-3-phenyl-3-pyrrolidinol hydrochloride at the 10 mg./kg. level and a complete reversal of the pressor action of adrenalin occurred with several compounds such as 1-methyl-3-phenyl-3-pyrrolidinol hydrochloride and 1-benzyl-3-phenyl-3-pyrrolidinol hydrochloride at the 20–25 mg./kg. level. In some cases the duration of the blocking action or depressor action against adrenalin extended over a considerable length of time, approaching two hours following dosages of 10–20 mg./kg. This occurred in the use of compounds such as 3-phenyl-3-pyrrolidinol hydrochloride and 1-n-butyl-3-phenyl-3-pyrrolidinol hydrochloride. In other compounds such as 1-isobutyl-3-phenyl-3-pyrrolidinol hydrochloride the reversal of the pressor action of adrenalin even at higher dosages of the heterocyclic compound was slow in onset.

Generally, the 3-phenyl-3-pyrrolidinols showed greater activity as adrenergic blocking agents than the 3-p-alkoxyphenyl-3-pyrrolidinols. The compound 1-ethyl-3-(3,4,dihydroxyphenyl) - 3 - pyrrolidinol additionally has been found to have utility as an adrenergic agent similar to 1-arterenol (Levophed).

The mechanism of action of the 3-aryl-3-pyrrolidinols is not known, but it would appear from the results that it may be a competitive action which selectively inhibits the response of effector cells ordinarily stimulated by adrenalin.

For solubility reasons the hydrohalide salt form of the compounds is usually preferred and quaternary ammonium compounds are also operable. It is understood in the following claims that pharmaceutically acceptable acid addition salts and quaternary compounds are equivalent to the free bases claimed. Various modifications may be made in the compounds of the present invention and it is to be understood that the invention is limited only by the scope of the appended claims.

I claim:
1. 3-phenyl-3-pyrrolidinol.
2. 1-ethyl-3-phenyl-3-pyrrolidinol.
3. 1-n-butyl-3-phenyl-3-pyrrolidinol.
4. 1-isobutyl-3-phenyl-3-pyrrolidinol.
5. 1-benzyl-3-phenyl-3-pyrrolidinol.
6. 1-ethyl-3-(3,4-dihydroxyphenyl)-3-pyrrolidinol.
7. 1-lower alkyl-3-phenyl-3-pyrrolidinol.
8. 1-lower alkyl-3-lower alkoxy phenyl-3-pyrrolidinol.
9. 1-benzyl-3-methoxy phenyl-3-pyrrolidinol.
10. A compound of the group consisting of 3-phenyl-3-pyrrolidinols of the following formula:

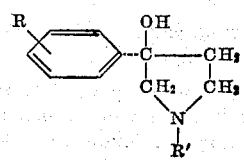

wherein R is selected from the group consisting of hydrogen, hydroxy, lower alkoxy, halogen and 3,4 dihydroxy; R' is selected from the group consisting of hydrogen, benzyl and lower alkyl and therapeutically acceptable acid addition salts thereof.

11. 1-lower alkyl-3-hydroxyphenyl-3-pyrrolidinol.

References Cited in the file of this patent

Southwick: Jour. Am. Chem. Soc., vol. 76, pp. 5667–71 (1954).